United States Patent [19]

Homeier

[11] Patent Number: 4,645,070

[45] Date of Patent: Feb. 24, 1987

[54] DUAL BEND CONVEYOR

[75] Inventor: Ronald F. Homeier, Plainfield, Ind.

[73] Assignee: PT Components, Inc., Indianapolis, Ind.

[21] Appl. No.: 668,897

[22] Filed: Nov. 7, 1984

[51] Int. Cl.[4] ..................... B65G 17/06; B65G 21/22; B65G 39/20

[52] U.S. Cl. ................................. 198/831; 198/840; 198/845; 198/853; 198/852

[58] Field of Search ............... 198/852, 850, 851, 840, 198/838, 845, 853, 831

[56] References Cited

U.S. PATENT DOCUMENTS

| | | | |
|---|---|---|---|
| 2,954,113 | 9/1960 | Hibbard et al. | 198/845 |
| 3,094,206 | 6/1963 | Stewart et al. | 198/834 |
| 3,285,394 | 11/1966 | Lanham et al. | 198/851 |
| 3,556,286 | 1/1971 | Naito et al. | 198/840 |
| 3,596,752 | 8/1971 | Garvey | 198/840 |
| 3,651,924 | 3/1972 | Homeier et al. | 198/840 |
| 3,669,247 | 6/1972 | Pulver | 198/840 |
| 3,876,061 | 4/1975 | Hammitt | 198/850 |
| 3,944,059 | 3/1976 | Garvey | 198/850 |
| 4,153,152 | 5/1979 | Lapeyre | 198/852 |
| 4,276,980 | 7/1981 | Oizumi | 198/851 |
| 4,531,631 | 7/1985 | Klefisch | 198/853 |
| 4,576,277 | 3/1986 | Park et al. | 198/853 |
| 4,597,492 | 7/1986 | Lachonius et al. | 198/852 |

FOREIGN PATENT DOCUMENTS 866123  6/1941  France ........................ 198/853

Primary Examiner—Joseph E. Valenza
Assistant Examiner—Daniel R. Alexander
Attorney, Agent, or Firm—Robert A. Brown

[57] ABSTRACT

A conveyor adaptable for bending in vertical and horizontal planes having a central guide and drive, steel base chain capable of being driven in two planes and a continuous, horizontal, carrying surface formed by a plurality of removable, non-metallic top plates having flexible, outwardly extending, finger members interlaced between one another and adaptable for slidable engagement and flexural movement when the conveyor moves in either a horizontal or a vertical plane.

11 Claims, 9 Drawing Figures

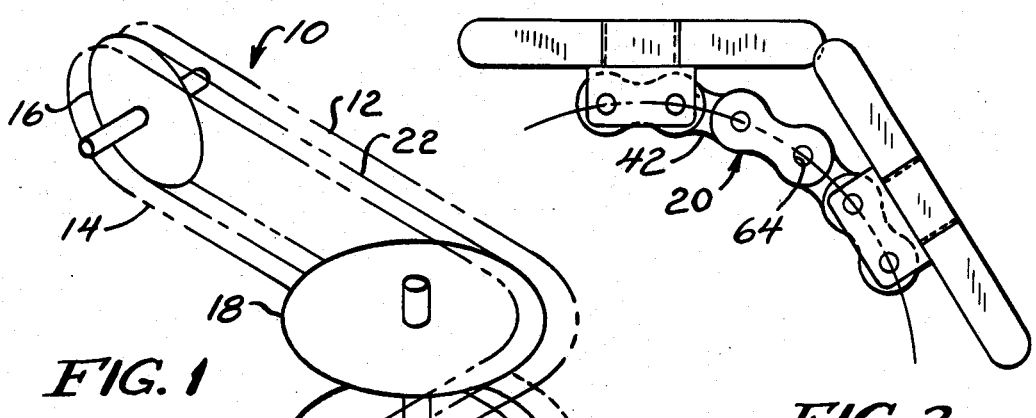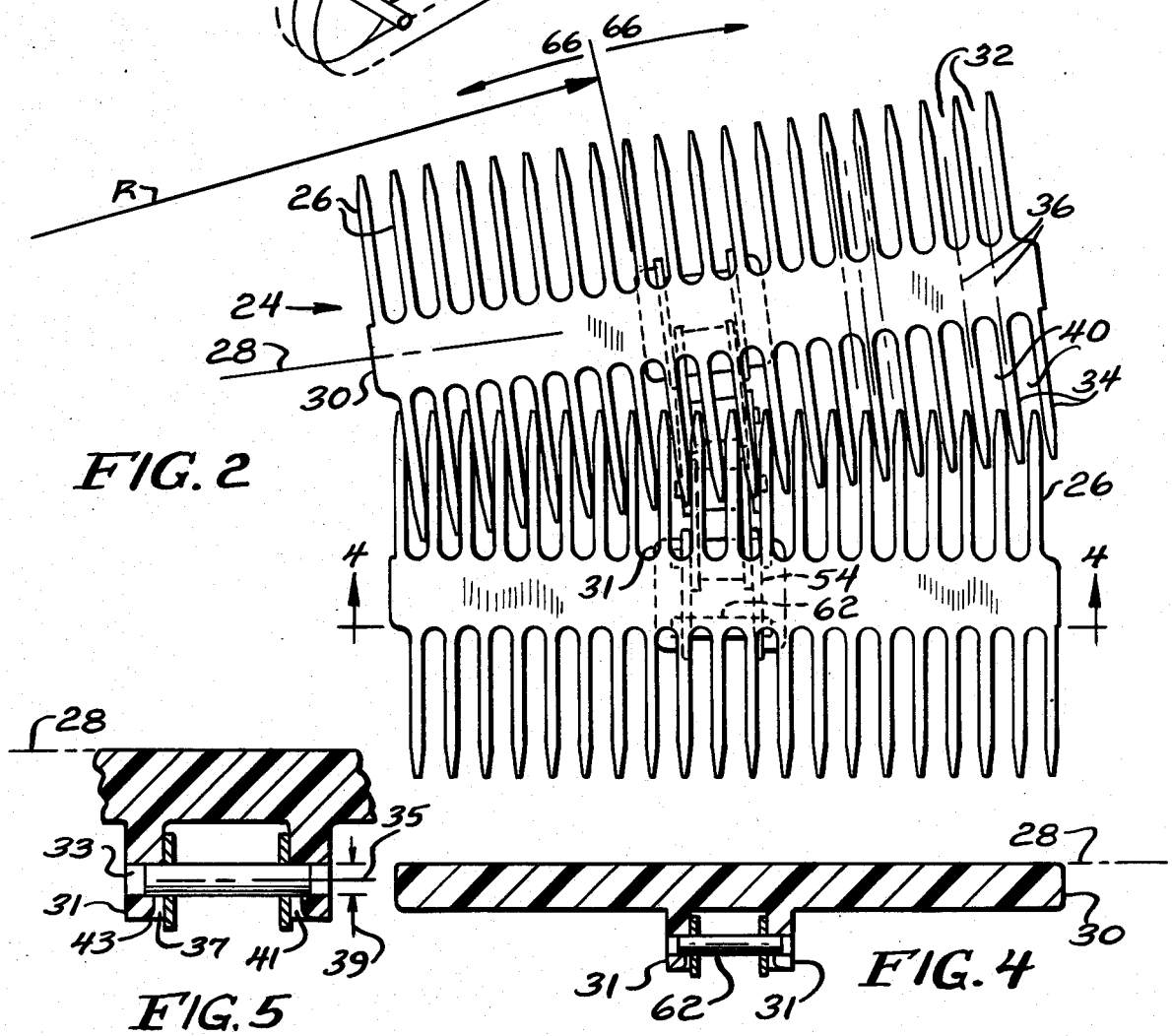

DUAL BEND CONVEYOR

BACKGROUND OF THE INVENTION

This invention relates to conveyors and more particularly to conveyors that have removable top plates that provide a continuous carrying surface and are capable of bending in both horizontal and vertical planes.

Poerink, U.S. Pat. No. 3,368,662 describes a conveyor belt comprising transverse rods having connecting links in the form of lamellas, thin plates, or wires. This conveyor is driven by dual spaced sprockets that engage the transverse rods.

Stuart et al., U.S. Pat. No. 3,094,206 shows several forms of conveyors. The form most pertinent to the present invention is shown in FIG. 11 and comprises a dual bend drive chain having U-shaped outwardly extending connecting links that mount horizontal and laterally extending support wires. The support wires form a noncontinuous conveying surface. As the conveyor is subjected to side bends, the spacing between the support wires is changed thereby limiting the minimum size of articles that can be carried without loss. Furthermore, the variation of spacing between the support wires of such a noncontinuous conveying surface renders it unsuitable for transporting tall cylindrical objects such as bottles.

Conveyors employing semi-circular meshing plate conveyor flights such as disclosed by U.S. Pat. Nos. to Dyson 2,157,283 and Davis 3,317,030 have serious limitations in that the articles conveyed must be centered on the flights to prevent spinning and upsetting of the articles when lateral bends are encountered.

Homeier et al., U.S. Pat. No. 3,651,924 discloses a conveyor chain having a continuous carrying surface that maintains a uniform, flat platform when the chain moves in either a straight line or a curved direction. The carrying platform is flexible and includes multiple, vertically oriented leaves telescopically mounted on transverse support rods that are carried on a central guide and drive chain. During bending movement of the conveyor, spacing between support rods varies; e.g., the spacing on the inside of the bend is smaller, and the spacing on the outside of the bend is progressively larger. The leaves being telescopically mounted with one another are effective to provide a continuous carrying surface and at the same time permit relative movement of the support rods. The disclosure and teaching of U.S. Pat. No. 3,651,924 are acknowledged and incorporated herein by reference.

While the noted references have provided partial solutions to the problems of transporting materials along a carrying surface, they are deficient in requiring a multiplicity of co-acting component parts that tend to excessive wear because of the constant sliding friction that occurs between and among rods, apertures, slots of leaves that provide a platform surface. Further, it is necessary to provide tabs, rounded corners, rivets, pins, and the like in order to achieve relatively trouble-free operation of the platform surface during movement of the conveyor as it is subjected to side bending forces. In addition, the telescoping action of the leaves causes variable spacing therebetween so that non-uniform interstices are formed in the carrying surface that fail to prevent smaller sized articles from falling through the chain.

All of these parts are of heavier construction and thereby reduce the payload which a conveyor may carry. Also, the multiplicity and complexity of the parts add greatly to the cost of the conveyor providing somewhat restricted application.

SUMMARY OF THE INVENTION

Accordingly, it is a primary object of the present invention to provide an improved conveyor having a removable top plate that provides a continuous carrying surface capable of bending in both vertical and horizontal planes. This object is achieved by providing a plurality of non-metallic flexible carrying members comprised of multiple, horizontally oriented projecting fingers that are mounted on transverse base supports carried by a central guide and drive chain. As the conveyor is bent, the spacing between the fingers varies, being smaller on the inside of the bend and progressively larger toward the outside. The inter-leaved projecting fingers, however, provide a continuous carrying surface while permitting relative movement between each top plate and its succeeding top plate arranged serially in a tandem oriented, endless chain type of conveyor.

A further advantage of the improved conveyor is smoother motion or operation during movement through lateral bends. This is achieved by guiding the central driving chain in the bends and attaching the non-metallic top plate to the chain in a manner permitting interlacing and rocking so that transmission of any shifting motions and vibration between drive chain and conveying band is minimized.

Another object is to provide a lighter and stronger chain having improved wear characteristics. In the conveyor of the present invention the conveyor driving force and tension are carried by the central drive chain thereby eliminating transmission forces from the non-metallic top plate.

Another advantage resides in the dual function of the vertical side rollers. These rollers, in addition to acting as guides, can also be driven by or idled around a horizontally oriented sprocket in lateral bends.

A conveyor in accordance with the present invention comprises a non-metallic flat conveying surface adaptable to be connected to a drive chain capable of being driven in vertical and horizontal planes comprising a centrally disposed base member attached to the drive chain extending transversely of the longitudinal path of the conveyor, a plurality of downwardly extending projecting tab means formed on the base member, each said tab means having formed therethrough a plurality of apertures, the apertures of one of said tab means having axes coincident with the axes of the apertures of the other of said tab means, notch means formed in vertical inner surfaces of the tab means having a width equal to the diameter of the apertures of the tab means, and a plurality of finger members extending outwardly from said base member in a direction substantially normal to the longitudinal axis of the base member, each of said finger members being shaped in the form of a vertically oriented parallelpiped, each of said finger members at its outermost extremity being shaped generally as a semi-circle.

DESCRIPTION OF THE DRAWINGS

The foregoing and other characteristics, objections, features and advantages of the present invention will become more apparent upon consideration of the following detailed description, having reference to the accompanying figures of the drawings, wherein:

FIG. 1 is a diagrammatic perspective view of a typical conveyor path having horizontal and vertical turns.

FIG. 2 is a top plan view of a portion of the drive chain of the conveyor chain showing a top plate attachment providing a continuous carrying surface for supporting articles on the chain and depicting the manner in which interleaved finger members adjust to bending of the chain.

FIG. 3 is a side view of the conveyor chain showing the manner in which the chain wraps itself around a drive or idler sprocket in moving from a horizontal to a vertical plane orientation.

FIG. 4 is a front elevational, sectional view of the conveyor chain taken along line 4—4 of FIG. 3 showing the manner in which the top plate is adapted to be connected to a monorail chain.

FIG. 5 is a fragmented, enlarged, sectional view of a portion of FIG. 4 showing greater detail of the connection between a top plate and a monorail chain.

DESCRIPTION OF A PREFERRED EMBODIMENT

Figure 6:
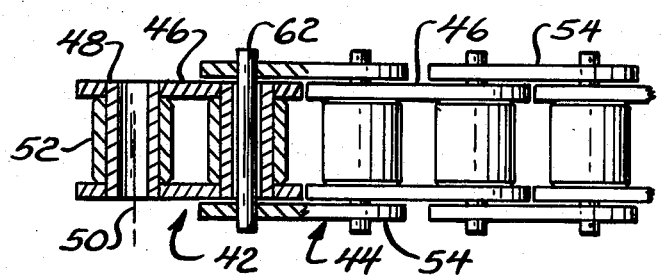
FIG. 6 is a top plan view of a portion of the drive chain showing the cooperative structure between roller links and pin links.

As shown in FIG. 1, a conveyor, generally indicated by the reference numeral 10, includes an upper conveying run 12 and a lower conveying or return run 14 disposed as an endless belt over and about a vertical sprocket 16, a horizontal sprocket 18 and any desired additional number or combination of vertical and horizontal sprockets to form a supporting base to move materials or parts from one location to another. A steel base chain 20 (FIGS. 3 and 6) that permits the support of high working loads, a greater length of working chain and a stronger, more durable construction is disposed along a longitudinal axis 22 of the conveyor 10. The steel base chain 20 is adaptable to cooperate with and be driven by teeth of the sprockets and operates to convey parts around corners and up and down inclines.

A molded non-metallic top plate, generally shown by reference numeral 24, is attached to the chain 20 in a manner hereinafter described and includes a first plurality of finger members 26 adaptable to flex laterally during operation of the conveyor when traversing about curvilinear paths of travel. The fingers 26 extend outwardly in a direction generally perpendicular or normal to a longitudinal axis 28 on a first side of a base member 30 of top plate 24. The finger members 26 on the first side of base member 28 are disposed having lateral spaces 32 therebetween. The top plate 24 also includes a second plurality of finger members 34 adaptable to flex laterally during operation of the conveyor when traversing about curvilinear paths of travel. The fingers 34 extend outwardly from a second side of the base member 28 in a direction generally perpendicular or normal thereto. The fingers 34 are disposed so that their longitudinal axes 36, if extended to the first side of the base member, would substantially bisect each lateral distance of the spaces 32 between fingers 26.

Similarly, longitudinal axes 38 of fingers 26, if extended to the second side of base member 28, would substantially bisect each lateral distance of spaces 40 between fingers 34. The configuration hereinabove described is formed to provide interlacing of fingers between adjacent top plates mounted on the supporting monorail type chain 20. The interlocking fingers 26 and 34 are interconnected between tandemly oriented top plates and flex back and forth in an interlacing relationship when traveling about curvilinear paths of travel to maintain a smooth continuous conveying surface. An absence of edges and wide gaps permits parts to accumulate at the end of a conveyor line and, simultaneously, permits the supporting chain and top plates to be free for movement under the parts or material being conveyed.

Projecting downwardly from the base member 30 substantially intermediate its ends but disposed on either side of a centerline of the base member are a plurality of spaced-apart tab means 31. The distance between the tab means 31 measured along longitudinal axis 28 of base member 30 is substantially equal to the width of the base chain 20 for a purpose to be hereinafter described in more detail. Each tab 31 is formed to provide at least two apertures 33 having axes 35 parallel to axis 28 of base member 30. An axis 35 of aperture 33 of one tab means 31, if extended toward the other tab means 31, will be coincident with the axis 35 of aperture 33 of the other tab means 31. Therefore, it will be readily understood that each tab means 31 has formed therethrough at least two apertures 33 that have axes 35 that coincide with axes 35 of apertures 33 of the other tab means 31 depending downwardly from the underside of the base member 30.

Each tab means 31 has formed at its lower end at least two notch means 37 having a length substantially equal to a diameter 39 of an aperture 33. Each notch means 37 includes an indentation or cut away portion 41 disposed at the lower extremity of a tab means 31, the cut away portion 41 extending into the tab means 31 for a distance somewhat less than one half of its thickness. In addition, each notch means 37 has formed at its lower end a slightly rounded portion 43 to permit ease of assembly onto the base chain 20.

The conveyor basically comprises the steel base chain and the non-metallic top plate. The steel base chain 20, as best seen in FIGS. 3 and 6, comprises multiple roller links 42 that are joined by connecting or pin links 44. Each roller link includes a pair of inside link plates 46 spaced by means of bushings 48 that extend therebetween and are securely fitted, as by swaging or other appropriate means, to the link plates 46. These bushings extend through the inside link plates 46. In addition to joining the inside link plates 46, the hollow bushings 48 further act as an axle 50 for mounting rotatable rollers 52 between the link plates. The connecting or pin links 44 are formed from outside link plates 54 and generally overlap and connect together a series of roller links 42.

The roller links 42 and pin links 44 are joined together to form a continuous chain by means of horizontal pins 62 that extend through the center of the hollow bushings 48 and which further extend through apertures 64 in the outside link plate portions 54 of the connecting links 44. The pins 62 extend through the outside link plate portions 54 and are press fitted or otherwise secured therein so that they remain in position. It will be understood that sufficient clearance is provided between the pins 62 and the inside of the hollow bushings 48 in order to allow relative rotation therebetween, thereby permitting flexure of the steel drive chain 20 in a vertical plane. Flexure in a vertical plane is a characteristic common to all roller chains.

The pins 62 also permit flexure of the chain 20 in a horizontal plane as depicted by arrows 66 in FIG. 2. This additional degree of flexibility is achieved by the pins 62 having a reduced diameter so that the diameter of the pin provides a sufficient amount of clearance with the bushing I.D. to permit lateral movement for side bending. The portion of the pins 62 that extend through the outside link plate portions 54, however, is maintained at a pin diameter which closely corresponds to the diameter of aperture 64. This structure permits secure mounting of the pins 62 to the outside link plates 54. It will be apparent that the reduced diameter of the horizontal connecting pins 62 allow a relative tilting motion between the connecting links 44 and the roller links 42 permitting the steel drive chain 20 to be bent in a horizontal plane as indicated by the directional arrows 66 (FIG. 2), as well as pivoting about the pins 60 in a vertical plane.

In the operation of the invention, the top plates 24 are assembled to the base chain 20 by means of a snap-on connection between tab means 31 and the roller and pin links combination that cooperate to form the chain 20. Each top plate 24 is connected to the chain 20 by placing tab means 31 over outside link plates 54 through which horizontal pins 62 protrude. The lateral distance between tab means 31 is substantially the same as the overall outside width of a pin link that forms the connection between roller links. Each tab means 31 is pushed downwardly over and about outside link plates 54 so that notch means 37 cooperate with and are disposed about the outer ends of at least two horizontal pins 62 in a snug and press fitted relationship. It will be understood that the rounded portions 43 of notch means 37 serve to facilitate the positioning and fitting into place of tab means 31 into a secure, assembled arrangement with the pin link portion of the chain 20. It will be further understood that tab means 31 has a degree of flexure so as to permit ease of placement and press fitting over and about the connecting links 44. This degree of flexure also permits ease in disassembly, whenever it is necessary to remove or replace a top plate 24 from or to the chain 20.

Figure 7:
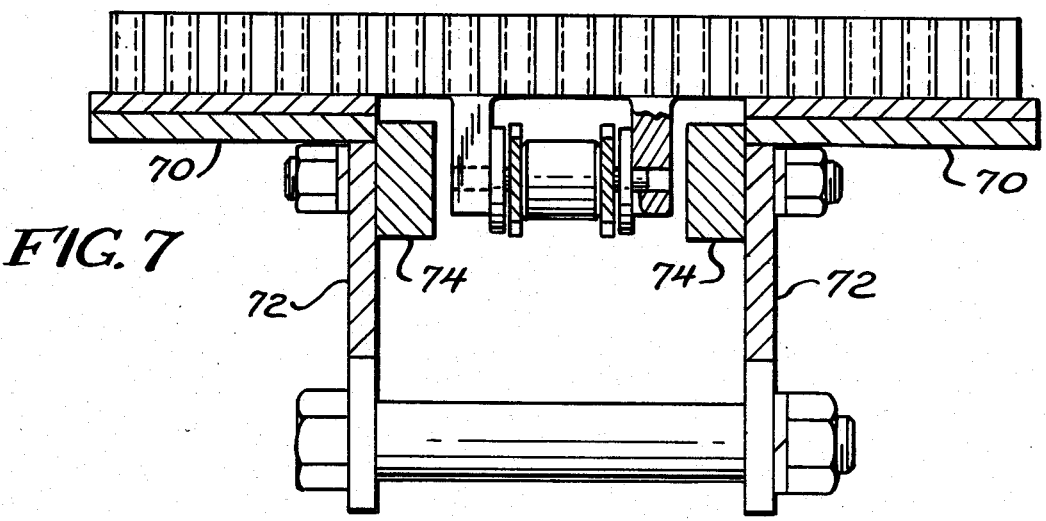
FIG. 7 is an exploded, elevational, sectional view of the drive chain and top plate combination showing the manner in which the top plate may be supported by structure disposed along the path of the conveyor and further depicting bearing surface means for minimizing wear as the chain is guided through bends and turns.
Figure 8:
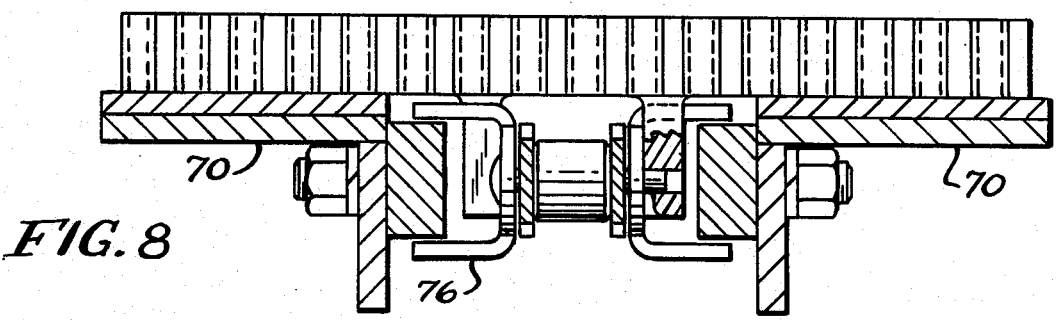
FIG. 8 is a view similar to that of FIG. 7 showing additional means in the form of side link construction forming a part of the pin link for cooperating with the bearing surface means to maintain the chain in a hold-down position as the chain moves through turns and along inclined planes.
Figure 9:
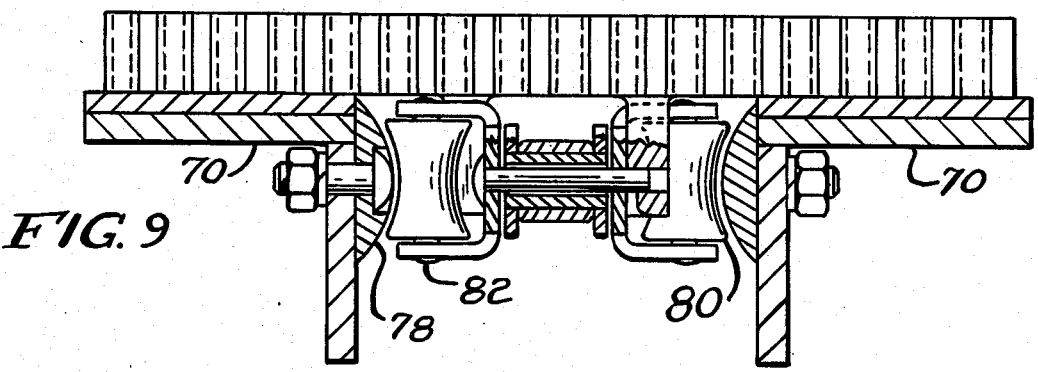
FIG. 9 is an elevational, sectional view of the structure of FIGS. 7 and 8 illustrating alternate embodiments of bearing surface means and side roller constructed for keeping the chain in hold-down position as it moves through turns and bends along inclined planes.

Now referring to FIGS. 7-9, it will be understood that the conveyor is moved along a supporting wear strip 70 that forms a part of support structure 72 of a known conveyor frame. The conveyor 10, as driven by the sprockets, moves between vertical support members and is generally provided some clearance therebetween. As shown in FIG. 7, to minimize wear and to assist in guiding the chain 20 through bends and turns, there are provided wear strip means 74 at intermittent locations along the path of travel of the conveyor.

In FIG. 8, a U shaped bracket member 76 is secured to or formed integrally as a part of an outside link plate 54 of a pin link 44. The U shaped portion of bracket member 76 is adaptable to encompass or grip loosely a portion of a wear strip 70 when the conveyor moves along its path of travel. The bracket member 76, when engaged with a wear strip, serves to maintain or hold down the conveyor in a proper position as it moves through bends and turns and along inclined planes.

In FIG. 9, there is shown a modification of the structure of FIGS. 7 and 8 wherein the wear or guide strip is formed having an oblate or rounded portion 78. Further, a conical roller 80 is disposed vertically by a pin 82 or other suitable means within the bracket member 76. The roller 80 is free to revolve about pin 76 and has a concave configuration substantially complementary to a convex configuration of oblate portion 78 of the guide strip 74. Thus, conical roller 80 when engaging rounded portion 78 of guide strip 74, provides a reduction in friction between the chain 20 and support structure 72 as the conveyor moves through bends and turns and along inclined planes along its path of travel.

The top plates, because of their non-metallic construction, are resiliently flexible, but are preferably molded or otherwise manufactured from plastic materials. Thus, the conveyor constructed from the present invention is effective to provide a continuous carrying surface having a low coefficient of friction that transports materials from one location to another. This low coefficient of friction permits parts to adhere to the top plates, but also allows the top plates to slide under the parts and permit accumulation at the end of a conveying line so that the parts can be removed when desired by manual or automatic means such as the employment of robotic manipulation.

Another advantage of the present conveyor is the combination of a high strength, steel roller chain with a lightweight, non-metallic top plate that is highly durable, provides greater payload capacity by being able to construct longer length conveying lines. This conveyor can be manufactured at much lower cost to suit a greatly wider range of applications and thereby achieve significant savings when compared to presently constructed conveyors.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An endless conveyor having a generally flat, continuous carrying surface adaptable for bending in vertical and horizontal planes including a centrally disposed guide chain for supporting said carrying surface wherein said guide chain comprises a plurality of pin links pivotally connected to roller links for engaging teeth of sprockets oriented normally to said carrying surface, reduced diameter pin means providing articulation of the roller links in the plane of the carrying surface, said pin means extending outwardly from the pin links to provide exposed pin link end portions, a plurality on non-metallic top plates removably secured to the guide chain, tab means extending downwardly from said top plates substantially intermediate their ends, notch means formed at a lower end of said tab means, said notch means being adaptable to receive said pin link end portions for securing said top plates to said chain, said top plates each comprises a base member, closely spaced, equal length laterally flexible finger members extending outwardly from said base member in a direction substantially normal thereto and adaptable to flex laterally during bending of said carrying surface in a horizontal plane, said finger members having unobstructed narrow, spaces therebetween, said narrow spaces between said fingers being shaped to receive in closely aligned relationship finger members of a like constructed top plate, said finger members being disposed in substantially equal numbers on either side of the base member, each of said fingers having a longitudinal axis extending from one side of the base member to substantially bisect a respective space between finger members disposed on the other side of the base member, said top plates when arranged tandemly on the guide chain having their finger members interlaced to form the conveying surface.

2. An improved top plate for forming a flat, continuous carrying surface of a conveyor comprising a base member, a first plurality of closely spaced equal length laterally flexible finger members arranged on a first side of said base member extending normally outwardly therefrom, said first finger members having unobstructed narrow lateral spaces therebetween and being unsupported at their outer ends, a second plurality of closely spaced laterally flexible finger members arranged on a second side of said base member extending normally outwardly therefrom, said second finger members having narrow lateral spaces therebetween and being unsupported at their outer ends, said narrow spaces between said fingers being shaped to receive in closely aligned relationship finger members of a like constructed top plate, each of said first and second finger members having a longitudinal axis that extends from its side of the base member to substantially bisect a space between finger members disposed on the other side of the base member, said first and second finger members of said top plate when interlaced with finger members of said like constructed top plate being effective to form said carrying surface of said conveyor and being adaptable to flex laterally during bending of said carrying surface in a horizontal plane.

3. An improved top plate for being removably attached to a conveyor chain, comprising a base member, connector means for releasably attaching said base member to said chain, said connector means being disposed substantially intermediate the ends of the base member, a first plurality of closely spaced equal length laterally flexible finger members arranged on a first side of said base member extending normally outwardly therefrom and being unsupported at their outer ends, said first finger members having narrow lateral spaces therebetween, a second plurality of closely spaced equal length laterally flexible finger members arranged on a second side of said base member extending normally outwardly therefrom and being unsupported at their outer ends, said second finger members having narrow lateral spaced therebetween, each of said first and second finger members having a longitudinal axis extending from its side of the base member to substantially bisect a space between finger members disposed on the other side of the base member, said first and second finger members when interlaced between a tandemly arranged series of top plates being effective to form a flat, continuous conveyor carrying surface capable of bending in horizontal and vertical planes and being adaptable to flex laterally during bending of said carrying surface in a horizontal plane.

4. An endless conveyor as claimed in claim 1 wherein each of said finger members is shaped substantially in the form of a vertically oriented parallelpiped.

5. An endless conveyor as claimed in claim 4 wherein each of said finger members has its outermost extremity shaped generally as a semi-circle.

6. An endless conveyor as claimed in claim 1 wherein said top plates are formed from plastic material.

7. An endless conveyor as claimed in claim 1 wherein said top plates are secured to said guide chain by a press fit between outer ends of the pin links and said notch means.

8. An improved top plate as claimed in claim 3 wherein finger members interlace with one another for substantially one half of their length so that overlapping always occurs to maintain the continuous carrying surface.

9. An endless conveyor as claimed in claim 1 comprising supporting frame means for directing the chain along a desired path of travel, and wear strip means disposed at spaced intervals on said support frame means for contacting and guiding the chain as it moves, bends and turns along said path of travel.

10. An endless conveyor as claimed in claim 9 comprising a plurality of bracket members secured to pin links at spaced intervals, outwardly disposed, top and bottom extension members formed on said bracket members for loosely engaging said wear strip members, said extension members when engaged with said wear strip means being effective to maintain the chain in a hold down position when moving along an inclined plane.

11. An endless conveyor as claimed in claim 10 wherein said wear strip means comprises an oblate convexly shaped outer surface, pin means connecting said top and bottom extension members of the bracket members, conical roller means disposed generally vertically about said pin means for rotation thereabout, said roller means having a concavely shaped outer surface formed generally complementary to said convexly shaped outer surface of the wear strip, said wear strip and said roller means being effective when engaged to reduce friction between the chain and said supporting frame means.

* * * * *